Aug. 6, 1929.   DE SOTO E. RICHARDSON   1,723,985
TOOL HOLDER
Filed April 8, 1926

Inventor
DeSoto E. Richardson
By Lloyd W. Patch
his Attorney

Patented Aug. 6, 1929.

1,723,985

UNITED STATES PATENT OFFICE.

DE SOTO E. RICHARDSON, OF RIVERSIDE, WASHINGTON.

TOOL HOLDER.

Application filed April 8, 1926. Serial No. 100,607.

This invention relates to tool holders, and particularly to a device of this character adapted and intended for use upon cultivators, weeders, and other agricultural implements.

An object of my invention is to provide a tool holder which can be built into a machine or can be applied to machines already in use, and which is of such construction that tools can be readily fitted in place and adjusted to suit varying requirements.

Another object resides in so constructing the tool holder that tool holding slots are provided to receive the shanks of various tools, and that the tools can be fitted in place and taken from the holder without the necessity of removing the usual clamping or securing nuts.

Still another object is to provide a tool holder adapted to take the seed spout of a planter attachment and with which the furrow opening and back filling tools can be adjusted relatively to the seed spout.

With the above and other objects in view, which will be apparent to those skilled in the art, my invention includes certain novel features of construction and combination of parts which will be set forth in connection with the drawing.

Figure 1:
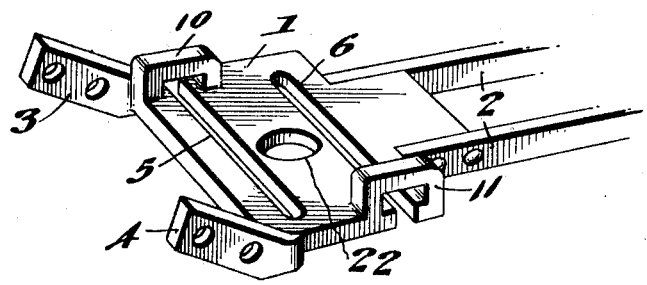
Figure 1 is a view in perspective showing one embodiment of my tool holder.
Figure 2:
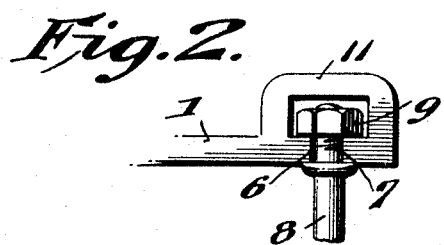
Figure 2 is a fragmentary view to better show the tool receiving slot and bridge loop.

Referring to Figs. 1 and 2, the body member 1 is formed as a portion of a weeder, cultivator, or other agricultural implement, the frame portions being connected as at 2, extensions 3 and 4 being provided on the body to have the handles of the implement fitted thereto.

The tool receiving slots 5 and 6 are provided to extend transversely into the body from opposite sides, the tool holder being thus made substantially S-shaped in top plan. These slots 5 and 6 are sufficiently wide to receive the shank 7 of a tool supporting stem 8, with a sliding fit, and the usual clamping nut 9 is provided to clamp and secure the shank in the desired adjusted position along the length of the slot.

While the structure as described might be used in some connections, the body is materially weakened by the formation of the slots 5 and 6 therein, and I provide bridge loops 10 and 11 at the open ends of the slots to give the proper strength to the body. These loops bridge across the open ends of the slots 5 and 6 with their ends spread from the sides of the slots and their tops elevated sufficiently to clear the clamping nuts 9, as shown in Fig. 2. With this construction and arrangement, the open ends of the slots are bridged and the body is made substantially as strong and rigid, as though the open ends of the slots were closed by the solid material of the body 1; however, the bridge loops do not in any way interfere with placement and removal of the tool shanks, and it is not necessary to entirely remove the clamping nuts from these shanks, with the consequent danger of misplacement or loss.

Figure 3:
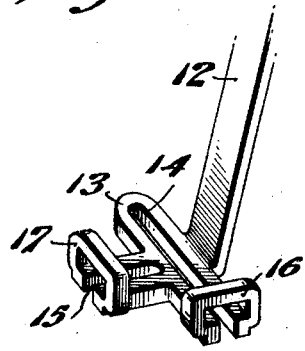
Figure 3 is a perspective view showing the modified construction of the tool holder.

In Fig. 3 I have shown a modified construction with the tool holder supported by a bar 12 adapted to be secured upon an agricultural implement. The body 13 has a tool slot 14 opening laterally at one side and a second slot 15 opening rearwardly and extending substantially at right angles to the slot 14. A bridge loop 16 is provided at the open end of slot 14 and a bridge loop 17 is provided at the end of slot 15.

Figure 4:
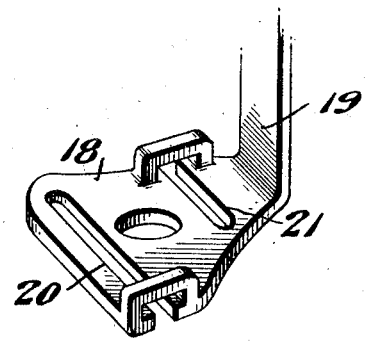
Figure 4 is a perspective view showing still another modified construction.

In Fig. 4 I have shown a body 18, similar to body 1, carried by the supporting bar 19, and this structure is substantially the same as shown in Fig. 1 with the exception that the tool receiving slots 20 and 21 are formed to open at opposite sides.

Where my improved tool holder is to be used with a planter attachment, the slots 5 and 6 are spaced apart sufficiently to provide for a planter spout receiving opening 22 through the intermediate portion of the body 1, and it will be appreciated that tools mounted in the slots 5 and 6 can be adjusted relatively with respect to each other and to the seed spout received through the opening 22.

While I have herein shown and described certain specific embodiments of my invention and have suggested only certain possible modifications, it will be appreciated that the tool receiving slots might be formed at other angles and that the parts might be otherwise variously constructed and shaped to suit different requirements of use without departing from the spirit and scope of my invention.

I claim:—

1. A tool holder having a tool receiving slot of substantially uniform width throughout opening laterally at one end to receive the shank of a tool stem, and a relatively short loop bridging over the open end of the slot with the connecting ends thereof joining with the tool holder at points spaced laterally on each side of said slot to clear the end of the stem sufficiently to permit free passage of the shank thereof and securing means carried by said stem and to give free access to the securing means when the stem is received within the main portion of said slot.

2. A tool holder for agricultural implements comprising a plate having tool receiving slots opening at opposite sides and extending laterally thereinto to thus allow the shank of a tool stem to be slid laterally thereinto with a fastening nut in place, and a relatively narrow bridge piece looped over the open end of each of said slots with the ends of the piece spaced forwardly and rearwardly from said slot to allow free passage of the fastening nut, said bridge pieces serving to reinforce the plate against yielding under pulling strain exerted at right angles to the extent of said slots and the staggering of the slots to open on opposite sides allowing said slots to be located closely adjacent to each other to thus give a relatively straight transverse alignment of tools mounted therein.

In testimony whereof I hereunto affix my signature.

DE SOTO E. RICHARDSON.